Aug. 29, 1967  A. A. BERNARD ET AL  3,339,057
MECHANICAL INTERMITTENT ARC WELDING
Filed July 28, 1966  3 Sheets-Sheet 1

Inventors:
Arthur A Bernard,
Richard A Bernard,
By Hume, Groen, Clement & Hume
Attys

Inventors:
Arthur A. Bernard,
Richard A. Bernard,
By Hume, Groen, Clement & Hume
Attys Fig. 10A
Time A Fig. 10B
Time B Fig. 10C
Time C Fig. 10D
Time D

United States Patent Office 3,339,057
Patented Aug. 29, 1967

3,339,057
MECHANICAL INTERMITTENT ARC WELDING
Arthur A. Bernard, 611 Country Lane, Beecher, Ill.
60401, and Richard A. Bernard, 2923 Sunset, Flossmoor, Ill. 60422
Filed July 28, 1966, Ser. No. 569,563
21 Claims. (Cl. 219—130)

This application is a continuation-in-part of copending application Ser. No. 520,157, filed Jan. 12, 1966, now abandoned.

This invention relates to a metal arc welding process for automatic and semi-automatic arc welding and to the apparatus for carrying out the process. The inventive process is characterized as a mechanical intermittent arc welding process. It involves unique cyclical alteration of the electrode feed rate to achieve highly desirable forms of depositing of weld metal. It is particularly significant that the apparatus provides mechanical means which can be embodied in or attached to the electrode feeding machine.

Intermittent drop transfer

One form of the invention overcomes the problem in automatic and semi-automatic arc welding of transferring metal to a weld metal pool in drop form (as distinguished from spray form) from the tip of an electrode being melted with moderate heat densities produced by moderate welding current densities. As will be seen, in the drop transfer form of the present invention, a drop of desired size is caused to build up on the tip of the electrode as a suspended drop and is detached by being brought into contact with the weld metal pool. The foregoing reference to moderate welding current densities does not mean that this form of the invention involves electrode metal deposition at slow rates. Indeed, the main object of the drop transfer form of the invention is to provide the welding industry with a mechanized gas-shielded metal arc welding process which converts an increased number of pounds of lectrode metal into weld metal per unit of time. This form of the invention, by making possible the use of moderate welding current density and moderate density of arc heat, eliminates the necessity of restricting bare-surface solid-wire gas-shielded arc welding to deposition of only the smaller sizes of electrode. By enabling transfer of electrode in drop form from a larger range of electrode sizes and at moderate welding current densities, the present invention also avoids the disadvantages, to be outlined later, which attend the ultra-high welding current densities used in conventional continuous spray-type arc welding. For example, present conventional practice is to deposit 3/64-inch diameter electrode in continuous spray-arc form with about 250 amperes of welding current which amounts to a current density of about 150,000 amperes per square inch area of electrode. By way of contrast, with the drop transfer form of the present invention 250 amperes can be used to deposit 3/32-inch diameter electrode which has four times the cross-sectional area of a 3/64 diameter electrode, and the welding current density will be one-fourth of 150,000 amperes per square inch or about 37,500 amperes per square inch.

The problem of satisfactorily transferring metal substantially in drop form from the tip of mechanically fed consumable wire type electrode has existed since automatic and semi-automatic arc welding first began and has led to widespread use of spray-arc welding despite the disadvantages of the latter. At the root of the drop transfer problem is the fact that a primary characteristic of conventional automatic and semi-automatic arc welding equipment in the maintenance of a substantially constant and uniform arc voltage by one of two different methods. In one of these methods, commonly called constant-potential welding, the electrode is fed at a constant preadjusted speed, and the amperage output from the power source automatically increases and decreases to melt the electrode at that rate which is required to automatically maintain the preadjusted arc voltage. In the other method, the welding power source delivers a substantially constant amperage to the welding arc, and the preset arc voltage is maintained by means for automatically increasing and decreasing the rate of electrode feed so that the melt-off rate is regulated to prevent variance in the arc voltage. The problem of satisfactory transfer in drop form has always existed because both of these methods automatically adjust to maintain a preset arc voltage, and thereby necessarily maintain a constant arc dimension since the arc voltage is a direct measure of the arc dimension. By "arc dimension" it is meant the distance between the two surfaces of different voltage potential which form the arc. Where the density of arc heat is such that the arc end of the electrode is heated only to the non-spray liquid state at which suspended drops of liquid metal cling to the tip of the electrode until they are detached, the automatically maintained arc voltage is a direct measure of the dimension which exists from the bottom surface of the clinging drop to the surface of the weld metal pool, just as it is a direct measure of the dimension from the solid end of the electrode to the surface of the weld metal pool when there is no drop clinging to the electrode. Therefore, the equipment used for automatically maintaining the preadjusted arc voltage actually tends to prevent the clinging drops of electrode metal from contacting the larger mass of liquid weld metal and being detached by the molecular surface tension force which exists in the larger mass of weld metal. If this surface tension force is not used for detaching the suspended drops of liquid electrode metal, the suspended drops cling to the tip of the electrode until they become so large that the force of gravity detaches them, which is too large to produce quality welding results.

As is generally known by those who are familiar with the history of arc welding, prior to 1930 many millions of feet of welding were applied automatically with consumable wire type electrode. For example, thousands of domestic hot water heaters were welded by several large manufacturers by what was then called automatic open-arc welding. In addition, hundreds of thousands of feet of spiral wrapped pipe were welded automatically with the bare-surface solid-wire electrode natural-gas shielded arc process, and in the early thirties hundreds of thousands of feet of common steel and stainless steel were welded by bare-surface solid-wire electrode shielded by inert helium gas and carbon dioxide gas. The welding in all cases mentioned above was of a very high quality even though the electrode metal was deposited by the above-mentioned conventional type of apparatus for maintaining a preset arc voltage and, hence, a preset arc dimension. Despite the arc voltage-maintaining tendency of the conventional apparatus, as each drop was melted at the tip of the electrode and reached a size which was about two-thirds or three-fourths the diameter of the electrode, the drop contacted the molten pool of weld metal and was detached. To accomplish this, however, the arc dimension had to be very short and the voltage had to be critically adjusted.

Regarding the early history dates of metal-arc transfer in drop form, which today is referred to as "Short-Circuit," "Short-Arc," "Drop-Transfer," "Dip-Transfer," etc., reference is made to The Welding Encyclopedia, Tenth Edition, published 1926–1941, pages 197 and 201.

In the description which will be given in full detail further on, it will be evident that this invention solves the above problem of satisfactory drop transfer by feeding the electrode to the welding operation in an intermittent fashion whereby the feeding of the electrode is stopped completely or substantially slowed down, permitting arc heat to melt a small size globule of metal at the tip of the electrode, then feeding the electrode at a rapid rate, meaning a rate more rapid than the melting rate, so that the suspended drop of metal comes into direct contact with the weld metal pool for detachment, at which instant the feed rate completely stops or slows down for another drop to form, with this intermittent feeding being adjustable to take place over a wide range.

Presently the drop transfer problem is avoided by a method disclosed and claimed in Muller Patent No. 2,504,868 in which a solid wire electrode is shielded with inert gas, and by a method disclosed and claimed in Bernard et al. Patent No. 3,051,822 in which a tubular type electrode is shielded with carbon dioxide gas. Both of these methods avoid the drop transfer problem by preventing drops from forming. This is accomplished by heating the end of the electrode with a sufficient density of arc heat to spray the metal through the arc, meaning that by the use of ultra-high current densities and hence ultra-high heat densities, the end of the electrode is melted and converted from a solid state directly into globules small enough in size to produce a spray transfer. However, the strong jet force produced by both of these methods restricts their use for the following reasons:

(a) Because of the strong jet force of the arc and hence, the deep penetration produced, these methods cannot be applied to metal of 5/32 inch thickness and less.

(b) The jet force penetrates much too deeply into underlying weld beads in multiple pass welding, therefore greatly increasing residual stresses.

(c) The weld metal produced by the high density heat is too fluid to be practical for vertical and overhead welding.

(d) The high vacuum produced by the strong jet force around the periphery at the electrode tip demands a more efficient means of shielding the welding operation from ambient air to prevent oxidizing and nitrogenizing ambient air from being sucked into the vacuumized area.

(e) It is difficult to push electrode in sizes of .045 inch diameter and smaller through the flexible conduit and the welding gun to the welding arc without buckling and kinking the electrode.

Another object of the drop transfer form of this invention is, therefore, to remove the above disadvantages by eliminating the need for transferring electrode metal through the welding arc by high jet force and ultra-high welding current densities.

Two methods of more recent development for transferring electrode metal to the weld metal terminal are disclosed and claimed in Tuthill et al. Patent No. 2,886,696 in which transfer is made by what is called "Dip Transfer" and "Short-Circuit Transfer" which are the same as the liquid drop transfer referred to above, but with special circuitry and components built into the power source which eliminates the extremely close arc adjustment formerly required, and a disclosure which appeared in the publication Welding Engineer, dated July 1965, by The British Welding Research Association in which is illustrated and described a method by which electrode metal is transferred by what is called a "Pulsed-Arc" method. It should be noticed when reading both of these disclosures that the main object of the inventors in each case was to eliminate the above-listed disadvantages of spray-arc welding. In both the Tuthill and the British methods, as in the present invention, the electrode metal is transferred substantially in drop form by contacting the liquid pool of weld metal. It may be noted that in the Tuthill disclosure all graphs, charts, and examples of data list the electrode size as 1/16 inch diameter and smaller, and in the British publication the size of electrode is also listed as 1/16 inch diameter and smaller. Applied with such miniature sizes of electrode and at the recommended current densities to produce drop transfer, these processes deposit upward of five pounds of electrode per hour. One of the main objects of the present invention is to deposit electrode metal at upwards to twenty-five pounds per hour when 1/8 inch and 5/32 inch diameter electrodes are used and even higher rates when a 3/16 inch diameter electrode is used.

A particular disadvantage of both the Tuthill and the British methods is that both require welding power sources with highly specialized characteristics. Therefore, if the welding industry prefers to use these methods in preference to the present power sources, investments of very large sums will be required. In consequence, another important object of this invention is to provide the welding industry with an intermittent drop transfer or intermittent spray transfer type process which converts present conventional equipment into a very high speed mechanized arc welding process at considerably lower cost. Moreover, the mechanical means for practicing the drop transfer form of the present invention is attachable as an accessory to most electrode feeding machines now in use.

For reasons of brevity, the drop transfer form of the present invention is described herein as a method for applying metal-arc welding processes which are shielded with gas fed to the arc from a separate source such as is disclosed in the Bernard and the Muller patents. However, this form of the invention is equally valuable for depositing electrodes which are self-shielding, meaning electrodes of a composite construction which contain materials which release a shielding gas as the electrode is melted for conversion into weld metal. Further, this form of the invention is even more valuable for depositing bare-surface solid-wire electrode with no further shielding than the ion metal vapor which is emitted naturally from the arc and which is ample for producing the quality of welds produced prior to 1930 mentioned above because a jet force does not exist at the tip of the electrode to suck oxidizing air into the arc.

*Intermittent spray transfer*

Another form of the present invention involves the transfer of electrode weld metal in the form of an intermittent spray. As pointed out in the foregoing discussion under the heading "Intermittent Drop Transfer," several disadvantages attend conventional continuous spray transfer welding. These disadvantages stem largely from the ultra-high heat density required for continuous spray transfer and from the resultant strong jet force of the arc. A main object of the intermittent spray transfer form of the present invention is to minimize these disadvantages considerably by reducing the average current density, and hence, heat density per unit of time.

Since the introduction of the Tuthill method, as described in Patent No. 2,886,696, and the "Pulsed-Arc" method, mentioned above, as disclosed in the publication Welding Engineer, dated July, 1965, both of which were developed to improve the efficiency of transferring metal from the tip of the electrode to the base metal terminal in liquid drop form, still another method has been disclosed by the Air Reduction Company called the "Pulsed-Spray Arc" welding method by which it is claimed electrode metal transfer is improved by pulsing the welding current density between a given low current density with which a drop of metal is melted at the tip of the electrode and a given high current density which transforms the suspended drop into a vaporous state for transfer through the arc in the form of a vapor spray. As for example, in Air Reduction's publication No. 4–66–5M–402 under "Process Principle" it is mentioned, "The pulsing current used may be considered as having its peak current in the spray-transfer current range and its minimum value in the globule transfer current range."

A particular disadvantage of the Air Reduction Company, "pulsed-spray arc" welding method is that, as in the method of the Tuthill Patent No. 2,886,696 and in the British Welding Research Association "Pulsed-Arc" method, a power source is required which has highly specialized characteristics. Hence, the cost of the apparatus for performing the process will be substantial. Accordingly, another important object of this invention is to provide the welding industry with an intermittent spray transfer process to which present conventional equipment can be adapted at relatively low cost. Moreover, the mechanical means for practicing the spray transfer form of the present invention in some cases will be the same as that used for practicing the drop transfer form of the present invention, thereby providing a marked degree of versatility.

As will be described in greater detail further on, intermittent spray transfer is provided in the present invention by intermittently varying the rate of electrode feed at a pre-adjusted frequency from a low rate of feed to a high rate of feed so as to cause the welding current output of a constant-potential-type power source to be intermittently varied at the pre-adjusted frequency between a low level at which a suspended drop of electrode metal forms at the tip of the electrode (because the current density during this period is within the drop transfer current density range) and a high level at which the suspended drop of liquid metal is converted into vapor metal (because the current density during this period is within the spray transfer current density range). Thus, the electrode metal is transferred to the weld metal pool in spray form, the spray transfer occurring intermittently at the preadjusted frequency. It should be noted that in this form of the invention, the voltage setting of the constant potential source, the feed rate, and the frequency of variation of the feed rate are adjusted to cause the current density to reach the spray transfer range prior to contact of the suspended drop with the weld metal pool whereas in the drop transfer form of the invention when using a constant-potential-type source these parameters are adjusted to prevent the current density from reaching the spray transfer range and to cause the suspended drop to contact the weld metal pool for detachment.

For the sake of brevity, the apparatus of the present invention will be described in connection with the description of the intermittent drop transfer form of the present invention and will then be referred to in connection with the description of the intermittent spray transfer form of the present invention.

A full and complete description of this invention follows with reference to the attached drawings in which.

*Intermittent drop transfer*

Figure 1:
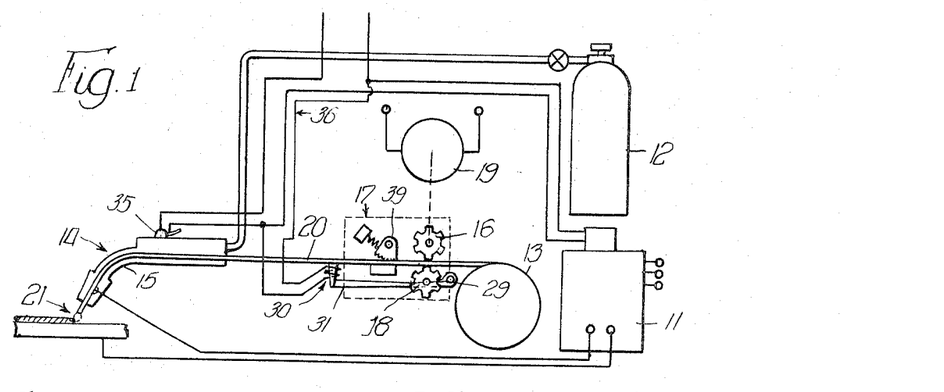
FIGURE 1 is a schematic diagram of the mechanical intermittent electrode feeding system.
Figure 6:
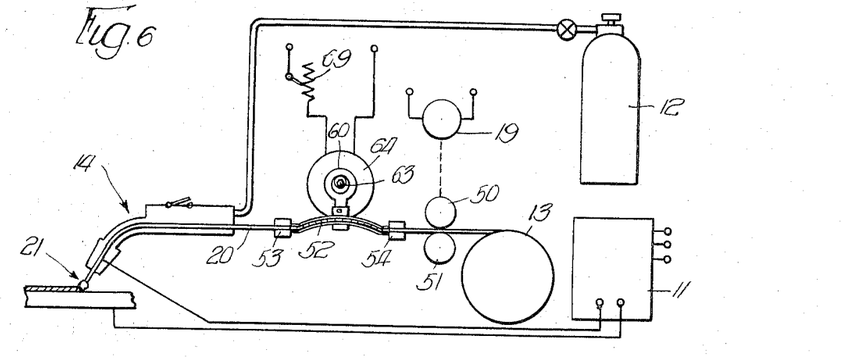
FIGURE 6 illustrates a different design and arrangement of apparatus which is adapted to feed electrode continuously in the conventional method, or by an intermittent stop and go method according to the present invention, or at an intermittent high and low rate according to the present invention.

Referring to FIGURE 1, the welding apparatus includes: a welding power source 11 which is the common constant-amperage variable-voltage type conventionally used for applying the manual stick-feed electrode process; a tank of shielding gas 12, if the type of electrode to be deposited is the type which requires shielding; a source of consumable welding electrode 13 in the form of a spool, reel, or peel-off pack; a welding gun 14, if the welding operation is to be manually guided along the course of welding, and if the welding operation is to be guided mechanically, then the gun generally has a straight barrel in place of a gooseneck 15 and the handle is omitted; and an electrode feeding machine 17, preferably of the type disclosed in Bernard Patent No. 2,931,890, wherein the feed rolls 16 and 18 powered by an electric motor 19 rotate continuously, and electrode 20 is fed when the constantly rotating feed rolls are brought into contact with the electrode. In the present form of the invention, the electrode feeding machine 17 has incorporated in its construction means for intermittently feeding the electrode 20 to the welding arc 21 in a definite feed and a definite no-feed sequence of operations which takes place many times per second. This definite feed and definite no-feed method of feeding the electrode can be carried out by the design and arrangement of the feed rolls 16 and 18 illustrated by FIGURES 2 through 4 which will be described later, or by any other design and arrangement of apparatus which will produce this stop and go feeding method. Alternatively, the feed rolls can be of conventional design to feed the electrode 20 at a constant selected speed when the constantly rotating feed rolls are in contact with the electrode, and with a design and arrangement of the conduit stretching member 52 shown in FIGURE 6, the constant feed of the electrode 20 is converted into a feeding motion wherein the rate of intermittent feed is increased beyond the constant rate of the feed rolls and then reduced to a speed which is less than the rate of the feed rolls. For example, if the feed rolls 50 and 51 in FIGURE 6 are adjusted to feed 200 inches of electrode to the welding operation per minute at an unvarying constant rate, then with stretching member 52 shown in FIGURE 6, this constant feed rate can be altered to feed the electrode 20 at a high rate of 300 inches per minute and a slow rate of 100 inches per minute with this sequence of operation taking place many times per second. And as will be described when specifically referring to FIGURE 6, the sequence of operations which takes place per second is adjustable for any rate of constant speed produced by the feed rolls 50 and 51. Further, the arrangement of apparatus shown in FIGURE 6 can be adjusted to produce a wave motion at the tip of the electrode 20, meaning that there is no definite starting and stopping of the electrode feed but rather, the feeding operation is a series of continuous cycles, many times per second, whereby the electrode is fed at two different rates of speed, and the rate of speed builds up gradually from the slow rate to the high rate and then gradually drops back down to the slow rate.

Referring more specifically to FIGURES 1 through 4, with this design and arrangement of apparatus, the feed rolls 16 and 18 rotate at a constant preadjusted speed during the actual welding operation. However, the electrode 20 is not fed at a constant rate, but rather is intermittently fed in a feed and no-feed series of operations. The intermittent feed apparatus consists of a shaft 22 which is driven by the feed motor 19 shown in FIGURE 1. Mounted on the shaft 22 is a spur gear 23 in mesh with another spur gear 24 which is keyed to a shaft 25. Therefore, the shaft 22 drives the shaft 25. To describe the drop transfer form of the invention, the spur gears 23 and 24 will be considered by way of example as each having a two inch pitch diameter. Also keyed respectively to the shafts 22 and 25 are two pairs of discs 26 and 27 which each have an outside diameter of about 2.010 inch in this example. The spur gears 23 and 24 time the feed rolls 16 and 18 relative to one another so that one of the serrated sections 37 on the feed roll 16 engages the electrode 20 at the same time as one of the serrated sections 37 on the feed roll 18. The driven shaft 25 is hinged at a pin 29. During the actual welding operation when the welding electrode 20 is being fed, the solenoid 30 is energized, and its pull force through the lever 31 tends to engage the rim faces of the discs 26 against the rim faces of the discs 27 and does engage the rim faces of these discs at those intervals of a second when electrode is not being fed. The 2.010 inch diameters of the discs 26 and 27 provide a .020 inch minimum separation between the pitch circles of the spur gears 23 and 24. Also keyed respectively attached to the spur gears 23 and 24 are feed rolls 16 and 18 which, to feed electrode of 3/32 inch diameter, for example, each have a diameter of about 1.9375 inch at the points of the serrations 34. Consequently, when the solenoid 30 is energized to feed the electrode 20 and the serrations 34 on the outer rim of feed rolls 16 and 18 are engaged with the surface of the electrode 20 to feed the electrode, the rim faces of the discs 26 and 27 are separated from each other .021 inch.

Figure 2:
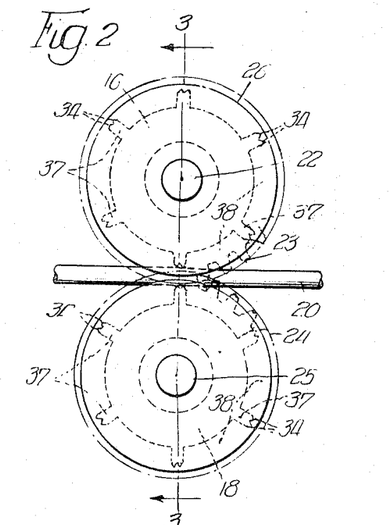
FIGURE 2 is one type and arrangement of apparatus used in the system of FIGURE 1 for intermittently feeding the electrode in a stop and go fashion many times per second.
Figure 3:
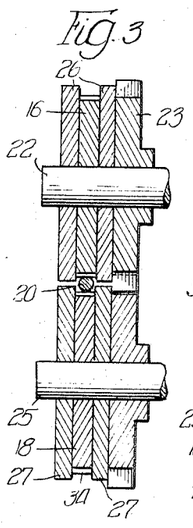
FIGURE 3 is a cross-sectional view taken at 3—3 of FIGURE 2.
Figure 4:
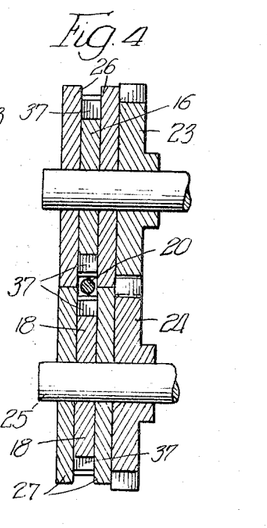
FIGURE 4 is the same cross-sectional view as FIGURE 3 but assuming that two no-feed spaces are passing over the electrode.
Figure 5A:
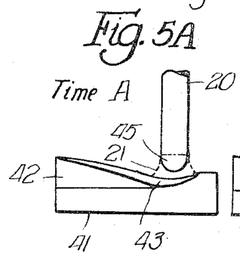
FIGURES 5A through 5D present a side view of the drop transfer phenomenon during one cycle of the intermittent transfer of one drop at a time by the stop and go apparatus of FIGURE 1.
Figure 5B:
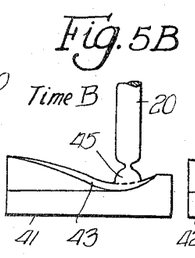
Figure 5C:
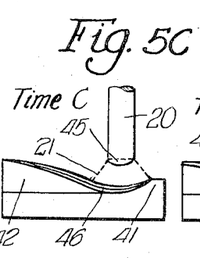
Figure 5D:
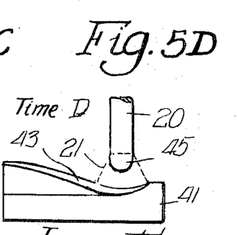

1.9375 inch diameter of feed rolls+.0937 inch diameter of electrode=2.0312 inch 2.0312 inch−2.010 inch diameter of discs=.021 inch However, the force of the solenoid 30 is such that the pointed serrations 34 bite into the electrode 20 about .005 inch deep. Consequently, when the feed rolls 16 and 18 are engaged with the electrode 20, the discs 26 and 27 are actually separated by about .010 inch.

When the electrode is being fed to the welding arc, the apparatus of FIGURES 1 through 4 operates as follows. To start welding, a control switch 35 in FIGURE 1 is snapped into the "on" position which through the circuit 36 energizes the welding power source 11 and also energizes the solenoid 30 and turns on the shielding gas, if shielding gas is used. With the solenoid 30 energized, the electrode 20 is fed intermittently by the rotation of the feed rolls 16 and 18 at that speed required to feed the desired number of inches of electrode per minute.

As previously mentioned, the diameter of the feed rolls 16 and 18 is about 1.9375 inch, which provides an effective circumference of about six inches. The six inch circumference of each of the feed rolls 16 and 18 is divided into six serrated or knurled sections 37 uniformly separated from one another by six intermediate spaces 38, each section 37 being approximately 1/8 inch in arcuate width at the rim.

With each revolution, six of the sections 37 will be in contact with the electrode 20 in the manner shown in FIGURE 3, and during passage of the six spaces 38 past the electrode 20, the discs 26 and 27 and the feed rolls 16 and 18 will be out of contact with the electrode 20. Keeping this data in round figures, with each revolution of the feed rolls 16 and 18 a total of six discrete lengths of 1/8 inch or a total of 3/4 inch of electrode are fed through the welding gun 14 to the arc 21. Hence, with the feed rolls 16 and 18 rotating at forty revolutions per minute, thirty inches of electrode per minute are fed. If the procedure of welding requires 120 inches of electrode per minute, then the rotating speed of the feed rolls in increased to 160 r.p.m. At 120 inches per minute, there are six 1/8 inch discrete lengths times 160 r.p.m. or nine hundred sixty 1/8 inch discrete lengths of electrode fed to the arc 21 per minute which amounts to sixteen 1/8 inch descrete lengths per second or about two-thirds the speed of a twenty-five frame per second standard motion picture. In other words, the rate of individual drop transfer is just about visible to the naked eye. If the 160 inches of 3/32 inch diameter electrode fed to the arc 21 per minute is expressed in terms of weight, approximately 0.23 pound of electrode are deposited per minute. With a 90% arc time duty cycle, this amounts to twelve and one half pounds per hour. To melt the intermittently fed 3/32 inch diameter electrode at a rate of 160 inches per minute requires about 650 arc amperes when carbon dioxide shielding is employed.

In actual practice, the no-feed spaces 38 on the feed rolls will normally be of greater arcuate width dimension than the feed sections 37. This condition is depicted in FIGURE 2.

FIGURES 5A through 5D illustrate how in the drop transfer form of the invention one suspended drop of liquid metal is formed and transferred from the tip of the electrode to the weld metal pool with each feed-no-feed mechanical cycle using the constant-amperage, variable voltage power source. It is important to understand that with this type of power source, the arc voltage as a measure of the arc dimension is determined by the size of the drops which are detached from the end of the electrode when the suspended drop contacts the weld metal pool. For example, if at the instant contact is made, the thickness of the drop is 1/8 inch, then in the next instant there is an arc of about 1/8 inch length, and during this instant no electrode is being fed. Consequently, this 1/8 inch length arc is melting both electrode and base metal and before electrode is again fed, the end of the electrode is melted back to where a drop slightly less than 1/8 inch thick is suspended from the end of the electrode. In the next instant, electrode is again fed moving this suspended drop toward the weld metal pool, and the arc continues to melt base metal and enlarge the size of the drop until contact is again made, and when contact is made there is no arc length at all because the arc is short-circuited. Therefore, as mentioned above, this invention is not an electrical system which automatically maintains a constant arc voltage; rather, it is a mechanical method which intermittently varies the arc dimension to produce intermittent liquid metal transfer one drop at a time, many times per second. In FIGURES 5A through 5D the electrode is identified as 20, the base metal as 41, solidified weld metal as 42, the molten weld metal pool as 43, the arc as 21, and the liquid electrode metal being transferred as 45. At time A, a stroke of the electrode feed has almost but not quite been completed, and hence the arc 21 dimension is but a few thousandths of an inch long. At time B, contact has just been made, and surface tension force of the larger mass of liquid weld metal 43 has started to detach the suspended drop 45. At time C, the arc 21 has again been established, but the electrode 20 is not being fed. However, the arc 21 is melting base metal 41 at the leading edge of the weld and has melted a small amount of metal at the tip of the electrode. What had been the drop of metal 45 in A has in B flattened out to form one more rippel 46 on the weld bead 42. At time D, the electrode metal has been melted back up to the electrode, and the size of the new suspended drop 45 is almost as large as shrown at time A, and it is at this instant that the electrode 20 is again fed to move the drop down through the arc to reproduce the condition at time A.

The adjustment of the welding apparatus as a whole to produce the type of transfer shown in FIGURES 5A through 5D is very simple. It is only necessary to know what the approximate amperage adjustment should be at the welding current source to melt a given size of electrode at a given speed in inches fed per minute. For example, as is generally known and as governed by the amount of ionizing material contained by the electrode, about 300 to 450 amperes are required to melt sixty inches of 3/32 inch electrode per minute when shielded in a carbon dioxide atmosphere. If the suspended drop which forms at the tip of the electrode is too large for efficient transfer, then amperage should be reduced or the rate of electrode feed increased because an oversize drop condition means that the rate of melting is too rapid for the rate of feed. If the size of drop transfer is too small, then the amperage should be increased or the rotational speed of the electrode feed rolls 16 and 18 reduced. It should be remembered, however, that the size of the suspended drop transferred, for a given number of inches of electrode fed per minute, can also be changed by the number of intermittent feeds per second by altering the dimension and/or number of the feed sections 37 in the circumference of the feed rolls, and that also for a given number of inches of electrode fed per minute, the delay between transfer periods can be increased or decreased by lengthening or shortening the no-feed spaces between the feed sections 37.

Further, the actual design of the intermittent feed apparatus need not be specifically as shown in FIGURES 1 through 4. For example, the rim of the feed rolls 16 and 18 can be continuous and cutouts or notches in the discs 26 and 27 can provide cam action for opening and closing the feed rolls.

In FIGURE 1 it should be noted that there is a spring loaded cam 39 which prevents a spring-back of the electrode 20 as it is pushed intermittently through conduit and gun to the arc 21. In other words, the cam 39 is arranged to permit forward movement of the electrode 20 but to prevent rearward movement of the electrode 20. Without such a device, an exact intermittent feed is normally not possible in the arrangement of FIGURE 1.

Referring more specifically now to FIGURE 6, the apparatus shown is usable in the drop transfer form of the invention with both constant-potential and constant-current types of power sources but will be described when used in combination with a constant-potential-type power source. As previously pointed out, a characteristic of the constant-potential power source is its tendency to maintain a preadjusted arc voltage which is a measure of the arc dimension. Nevertheless, conventional constant-potential power sources do not provide a perfectly flat voltage amperage curve but rather a curve in which the voltage declines somewhat with increasing current. Moreover, the melt-off rate does not vary perfectly to maintain an exact arc dimension, particularly at moderate current densities and when the feed rate is changed rapidly. In the drop transfer form of the present invention when utilizing a constant-potential power source, it is believed that these factors when combined with the fact that a relatively large drop of suspended electrode metal is formed on the tip of the electrode at the relatively slow rate of feed, cooperate to enable the suspended drop to contact the weld metal pool for detachment when the electrode feed rate is increased. The extremely short arc length and very critical voltage setting required for drop transfer prior to and during the 1930's is overcome.

The apparatus in FIGURE 6 consists of two conventional feed rolls 50 and 51, driven at a constant speed by the motor 19. The rotating speed of the feed rolls 50 and 51 is preferably adjustable to feed electrode at any speed from 25 to 250 inches per minute. This feed range is lower than conventional because a larger range of electrode sizes is normally deposited with this invention. That part of the apparatus of FIGURE 8 which converts the constant and continuous feed from the feed rolls 50 and 51 into the intermittent feeding method consists of a stretchable flexing member 52 such as a coiled spring, the ends of which are attached to two bushings 53 and 54 by set screws 55 and are spaced from each other at fixed points. The stretchable member 52 is lined with very hard short length bushings 56, preferably about ¼ inch in length and made of tungsten carbide to withstand wear. The length of the stretchable member 52 can be any suitable length, but is preferably about six inches long. Midway in the length of member 52 is a lug 57 provided with a bore 58 for embracing the stretchable flexing member 52. In operation the electrode 20 is threaded through bushings 56.

Figure 7:
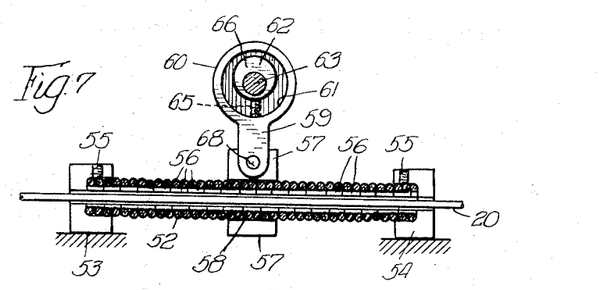
FIGURE 7 is an enlarged view of the stretching apparatus used in the system of FIGURE 6 to provide intermittent electrode feed according to the present invention.

A connecting rod 59 is pivotally connected at one end to the lug 57 by a pin 68. The opposite end of the connecting rod 59 is formed to provide an enlarged circular portion 60 having a circular opening 61, the inner periphery of which serves as a cam follower as will be seen. Disposed within the opening 61 is a circular cam 62 which is eccentrically mounted on a second circular cam 66. The circular cam 66, in turn, is eccentrically mounted on the shaft 63 of a geared head electric motor 64. A set screw 65 located within the cam 62 is used to fix the cams 62 and 66 in a desired position relative to one another. The rotating speed of shaft 63 is adjustable by any suitable means 69. When, as shown in FIGURE 7, the center of the circular cam 62 is concentric with the axis of the motor shaft 63, no stretching action takes place in stretchable member 52. However, when the center of the cam 62 is located off-center with respect to the axis of the motor shaft 63, as shown in FIGURE 8, with the motor 64 rotating, the stretchable flexing member 52 is repeatedly flexed from a straight line to the shape of a bow.

Figure 8:
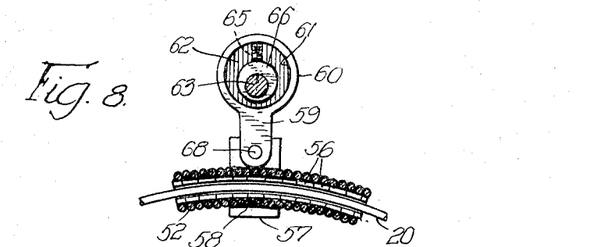
FIGURE 8 is also an enlarged view of the flexing apparatus in FIGURE 6 in the flexed position.

The conduit stretching apparatus shown in FIGURES 7 and 8 makes use of the difference in length of the member 52 between the bushings 53 and 54 as a straight line as in FIGURE 7 and as an arcuate line as in FIGURE 8. Actually for the reason that the ends of member 52 are telescoped into bushings 53 and 54, the member 52 is not stretched and flexed into a section of a true circle but rather into the shape of archer's bow. Therefore, it is easier to find the difference in length between the straight six inch length and the arced line by trial and error than by calculation, and by these findings calibrate the adjustable means 65. It has been found that if the member 52 is six inches long and is stretched to be flexed ¾ inch, the difference in length is ³⁄₁₆ inch. By adjusting the amount flexed in eights of an inch, the difference in lengths of electrode threaded through member 52 per unit of time is adjustable in ¹⁄₃₂'s inch. Before describing how the apparatus is adjusted to convert a continuous rate of electrode feed into an alternating high and low rate of speed as it leaves the member 52, it may be noted by way of example that, if the electrode 20 is fed into the member 52 at the rate of ⅛ inch each one-tenth of a second or seventy-five inches per minute and the member 52 is being flexed ten times per second with the flexed dimension of the electrode 20 through the member 52 being the six inch straight length plus ¹⁄₁₆ inch, then during one-twentieth of a second when the electrode 20 is being pushed into the member 52 by the feed rolls 50 and 51 no electrode is being fed out of the opposite end of the member 52 because a ¹⁄₁₆ inch length section is stored in the member 52 until this member is unflexed, at which time the stored length is added to the ¹⁄₁₆ inch length fed into this member during the preceding one-twentieth of each second. Therefore, although the electrode 20 is pushed into member 52 at a continuous and constant rate of one ⅛ inch length every one-tenth of a second, the electrode 20 leaves this member at an intermittent rate of one discrete ⅛ inch length every other one-twentieth of a second. In other words, this would be a stop and go method as produced by FIGURE 1. However, due to the cam action, the start and finish of each feeding cycle is gradual with the highest rate at the median of the cycle.

It requires only one adjustment to convert the above feed-and-no feed operation into one where the electrode is fed out of the welding gun to the arc at an intermittent slow rate and fast rate of speed. For example, the means 65 is adjusted to provide for a ¹⁄₃₂ inch addition to the length of the member 52 when the member 52 is flexed by stretching. With this adjustment, a ¹⁄₁₆ inch length of electrode is pushed into the member 52 during the one-twentieth of a second flexing period but only one-half of the ¹⁄₁₆ inch length emerges from the member 52 during the flexing period; the other one-half of the 1/16 inch length is stored until the member 52 is unflexed. The stored 1/32 inch length adds to the 1/16 inch length pushed into the member during the one-twentieth of a second unflexing period to provide a 3/32 inch output during the unflexing period and a total of 1/8 inch output each one-tenth of a second.

FIGURES 9A through 9D illustrates in four stages the phenomenon believed to occur in the drop transfer form of the invention in one-tenth of one second during the formation and transfer of one suspended drop of metal from the tip of the electrode 20 to the molten weld metal bead 43 when carried out by the adjusted procedure outlined directly above. At time A, detachment of a suspended drop 45 of electrode metal is being completed to leave the tip of the electrode 20 at an elevated level. At time B, the arc has been re-established, the electrode 20 is being fed at the slow rate of speed, permitting a new suspended drop 45 of electrode metal to build up on the tip of the electrode 20. At time C, the new drop 45 has almost reached the proper size for detachment, and the feed rate has increased to effect detachment. At time D, the drop 45 has contacted the weld metal bead, and detachment takes place as the feed rate again begins to drop.

*Intermittent spray transfer*

Figure 9A:
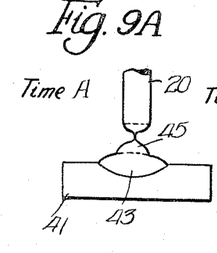
FIGURES 9A through 9D present an end view of the phenomenon of transfer of one drop by a high and a low rate of intermittent feed by the apparatus shown in FIGURE 6.
Figures 9B, 9C, 9D:
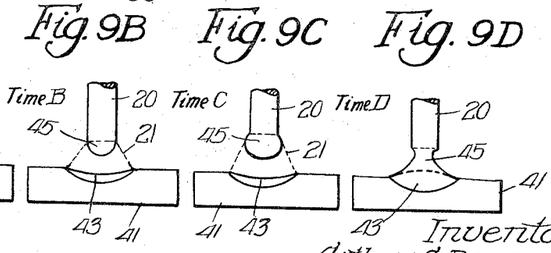

Referring now to FIGURES 10A through 10D which illustrate in four stages the phenomenon of melting a drop of metal at the tip of the electrode and then vaporizing this drop of metal for transfer through the arc to the weld bead pool in the form of a spray. The apparatus shown in FIGURES 6 through 8 is used to produce this phenomenon. The power source 11 for this form of the invention is a conventional constant-potential-type. The difference in the phenomenon illustrated in FIGURE 10 as compared to the drop transfer illustrated in FIGURE 9 is attained by adjustment of the arc voltage in correlation with the feed rate and frequency of variation of the feed rate. As previously noted, to produce drop transfer according to the present invention when using a constant-potential-type source, these parameters are correlated to cause a suspended drop of the desired size to be formed and then brought into contact with the weld bead pool for detachment. By contrast, in the intermittent spray transfer form of this invention, these parameters are adjusted to cause a suspended drop to be formed in the same manner, but the current density is caused to reach the spray transfer range before the suspended drop contacts the weld metal pool. Hence, the voltage setting for intermittent spray transfer will normally be higher than the voltage setting for drop transfer.

An appropriate welding procedure which can be used to attain the phenomenon of the four stages of FIGURES 10A through 10D employs the use of 1/16 inch diameter mild or low alloy steel electrode. The suspended drops of metal are melted with about 110 amperes, which produces a current density of about 35,000 amperes per square inch area of electrode, and to produce the 110 amperes the 1/16 inch size electrode is fed during the melting portion of the cycle at a speed of about 55 inches per minute. To efficiently vaporize the suspended drops of metal for transfer as a spray, the high level of the welding current is about 330 amperes to produce a current density of about 105,000 amperes per square inch area of electrode, and for the constant-potential-type power source 11 to produce this higher level of current density the electrode feed would be about 165 inches per minute during the spray portion of the cycle. To intermittently vary the feed rate of the electrode from 55 inches per minute at the low level and 165 inches per minute at the high level so as to intermittently vary the output amperage of the power source, the electrode feed rolls 51 shown in FIGURE 6 would be adjusted to feed about 110 inches of electrode per minute into spring conduit member 52, and the cam 62 shown in FIGURES 7 and 8 would be adjusted, as previously described, so that as conduit 52 is stretched upward, about one-half of each inch fed into conduit 52 is stored, which results in a feed rate of about 55 inches per minute to the welding arc during the period when conduit 52 is stretched upward, and during the downward stroke when conduit member 52 is being returned to its straight position, the one-half of each inch of the electrode stored in the up stroke is added to the 110 inches per minute fed into this member at a constant rate by feed rolls 51 to produce a feed rate of about 165 inches per minute.

Referring specifically to the four stages FIGURES 10A through 10D, it should be noted that the arc dimension is shown greater than the arc dimension in FIGURES 9A through 9D. This reflects the point previously made that a higher voltage setting and hence greater arc dimension is normally required for intermittent spray transfer than for intermittent drop transfer in order to cause the current density to reach the spray transfer range before the suspended drop contacts the weld bead pool. At time A in FIGURE 10, the tip 47 of the electrode 20 is substantially bare of liquid metal because the preceding high current density period that caused a suspended drop of metal to be vaporized and transferred in spray form has just ended. The ions 49 are sufficient in density, however, to support a continuing arc. At time B electrode 20 is being fed at the low rate of feed to lower the welding current density to that range in which electrode metal is melted and not sprayed. Hence, a suspended drop 45 of liquid metal is being formed on the tip of the electrode 20. At time C the low current density period produced by the low rate of electrode feed has been completed, and the suspended drop 45 has reached the desired size for vaporization. At time D the electroe 20 is being fed at the higher rate of feed, causing the current density to rise into the spray transfer range. As shown diagrammatically, the weld metal is being transferred to the weld bead pool in the form of a spray. At the end of the high feed rate period, the tip 47 of the electrode 20 will again be substantially bare of liquid metal as shown at time A.

By way of example, if the feed rolls 50 and 51 feed electrode into flexible member 52 at a rate of 150 inches per minute, and if the flexible member 52 is stretched and relaxed at a rate of 50 times per second, then each drop 45 formed on the tip of the electrode 20 and eventually vaporized would be formed by about .037 inch of electrode, and the intermittent spray transfer would take place at a frequency of approximately 50 cycles per second. The particular settings of the voltage, feed rate, and the frequency of alteration of the feed rate will depend upon the size of electrode used, the size of drop to be formed prior to the spray transfer period, and the frequency of intermittent spray transfer desired. It should be noted that in some instances, more electrodes may be vaporized and transferred in spray form during the high current density period than the volume of electrode converted into liquid form and suspended as a drop during the preceding low current density period.

Although certain specific terminology and uses have been specified in the description of the invention, it is to be understood that this is primarily by way of example and is not to be construed as a limitation. It will be apparent to those skilled in the art that modifications may be made within the scope of the claims without departing from the spirit of the invention.

It is seen from the foregoing detailed description that the present invention provides in essence a cyclical alteration of the rate of feed of the consumable electrode at a preset frequency so as repeatedly to cause a suspended drop of liquid electrode metal to be formed at the tip of said electrode during a period of zero or low feed rate and then transferred in drop or spray form to the welded metal pool during a period of high feed rate.

What is claimed is:

1. In automatic and semi-automatic arc welding in which consumable electrode is withdrawn from a source and fed to and through a welding gun toward a workpiece by an electrode feeding machine while an electrical potential is impressed between said consumable electrode and said workpiece in a circuit including a source of current so as to provide a welding arc, a method for intermittent arc welding comprising: by a mechanical means embodied in said electrode feeding machine stopping feed of said consumable electrode for a first period of time, then feeding said electrode for a second period of time at a rate which exceeds the melting rate of said electrode to complete a cycle, and repeating said cycle at a predetermined constant frequency so as repeatedly to cause a suspended drop of electrode metal to be formed on the tip of said electrode during said first period of time and then brought into contact with liquid weld metal during said second period of time for detachment and transfer to said workpiece, said welding arc in each cycle being short-circuited by said contact and re-established by said detachment.

2. In automatic and semi-automatic arc welding apparatus, the combination for providing intermittent arc welding comprising: a source of consumable electrode; a welding current circuit including an electrical energy source for establishing a welding arc between said consumable electrode and a workpiece; a welding gun for directing the welding operation; and means for mechanically withdrawing said electrode from said source and feeding said consumable electrode to and through the welding gun toward said workpiece at a feed rate cyclically changing to an extent and at a regular frequency pre-correlated with the voltage and current characteristics of said electrical energy source to repeatedly form a suspended drop of liquid electrode metal at the tip of said electrode and then bring said suspended drop into contact with liquid weld metal on said workpiece for detachment of said drop from the tip of said electrode, said welding arc thereby repeatedly being extinguished upon contact of said suspended drop with said liquid weld metal and re-established immediately after detachment of said suspended drop so as to form a new suspended drop.

3. The combination defined in claim 2 wherein said electrical energy source is characterized by substantially uniform current supply despite changes in the welding arc dimension.

4. The combination defined in claim 2 wherein said electrical energy source is characterized by increasing current supply with decreasing welding arc dimension.

5. In automatic and semi-automatic arc welding apparatus, the combination for providing intermittent arc welding comprising: a source of consumable electrode; a welding current circuit including an electrical energy source for establishing a welding arc between the tip of the consumable electrode and a workpiece; a welding gun for directing the welding operation; a pair of feed rolls having opposed traction rim surfaces for at least portions of their circumferences for mutually engaging and feeding said electrode; means for driving said pair of feed rolls at a preselected speed; and means causing said electrode to be released from engagement by said traction surfaces of said pair of feed rolls and stopped at regular intervals so as repeatedly to cause a suspended drop of electrode metal to be formed on the tip of said electrode and then brought into contact with liquid weld metal on the workpiece for detachment and transfer of said suspended drop to said workpiece, the welding arc thereby repeatedly being extinguished when said suspended drop contacts said liquid weld metal and re-established immediately following detachment of said suspended drop so as to form a new suspended drop.

6. In automatic and semi-automatic arc welding apparatus, the combination for providing intermittent arc welding comprising: a source of consumable electrode; a welding current circuit including an electrical energy source for establishing a welding arc between the tip of the consumable electrode and a workpiece; a welding gun for directing the welding operation; a pair of feed rolls having opposed traction rim surfaces for mutually engaging and feeding said consumable electrode; means for driving said pair of feed rolls at a preselected speed, at least one of said pair of feed rolls having circumferentially spaced recesses in its traction rim surface for repeatedly and transiently releasing traction engagement of said electrode by said pair of feed rolls so as repeatedly to cause feed of said electrode to cease to enable said welding arc to form a suspended drop of electrode metal on the tip of said electrode and then cause feed of said electrode to continue so as to bring said suspended drop into contact with liquid weld metal on said workpiece for detachment and transfer of said suspended drop to said workpiece, said welding arc thereby repeatedly being extinguished when said suspended drop contacts said liquid weld metal and re-established immediately following detachment of said suspended drop so as to form a new suspended drop.

7. The combination defined in claim 6 further comprising spring-loaded cam means for resisting spring-back of said electrode so as to insure stoppage of electrode feed when said electrode is released from traction engagement by said pair of feed rolls.

8. The combination defined in claim 6 wherein both of said pair of feed rolls have circumferentially spaced recesses in their traction rim surfaces, said pair of feed rolls being oriented and rotatably synchronized such that said recesses on one of said pair of feed rolls cooperate with said recesses on the other one of said pair of feed rolls in repeatedly and transiently releasing said electrode from traction engagement by said pair of feed rolls.

9. The combination defined in claim 8 further comprising at least one pair of circular discs each being coaxial with one of said pair of feed rolls for providing separation between said pair of feed rolls when said electrode is released from traction engagement by said cooperating recesses in said traction surfaces of said pair of feed rolls.

10. In automatic and semiautomatic arc welding apparatus including a source of consumable electrode; a welding current circuit having an electrical energy source for establishing a welding arc between the tip of the electrode and a workpiece; a welding gun for directing the welding operation; and a power driven pair of feed rolls for withdrawing the consumable electrode from the source and feeding it through a conduit and the welding gun to the welding zone, the combination therewith for providing intermittent arc welding comprising: elongated flexible means including a passageway therethrough for conducting said consumable electrode, said flexible means being longitudinally elastic and being mounted so as to normally occupy a straight line position and so as to increase in length when laterally flexed; and means for cyclically flexing and unflexing said flexible means laterally at a present frequency so as repeatedly to cause feed of said electrode to proceed in a low rate range or to cease and then to cause said electrode feed to proceed in a high rate range as said elongated means is being unflexed and thereby shortened.

11. The combination defined in claim 10 wherein said elongated means comprises an elongated tension spring lined with a series of bushings and having its end portions secured at fixed locations.

12. The combination defined in claim 11 wherein said means for flexing said elongated means comprises: a shaft; means for rotatably driving said shaft at a preselected speed; a first circular cam eccentrically mounted on said shaft; a second circular cam eccentrically mounted on said first circular cam; means for selectively adjusting the degree of eccentric displacement of the center of said second cam with respect to the axis of said shaft; and connecting means for translating eccentric rotation of said second cam into lateral flexing and unflexing of said elongated tension spring.

13. The combination defined in claim 12 wherein said connecting means comprises: a connecting rod including a circular cam follower surface at one end; and a member engaged about said elongated tension spring intermediate the ends of said tension spring, said member being pivotally connected to the opposite end of the connecting rod such that said tension spring is laterally flexed and unflexed by eccentric rotation of said cam.

14. In automatic and semi-automatic arc welding in which consumable electrode is withdrawn from a source and fed to and through a welding gun toward a workpiece by an electrode feeding system while an electrical potential is impressed between said consumable electrode and said workpiece in a circuit including a constant-potential-type source so as to provide a welding arc, a method for intermittent arc welding comprising: by mechanical means associated with said electrode feeding system, feeding said consumable electrode at a reduced feed rate which produces a current density within the range causing melting of said electrode into liquid form so as to form a suspended drop of electrode metal on the tip of said electrode, then feeding said consumable electrode at an increased feed rate which porduces a current density within the range causing spray transfer of said suspended drop of electrode to said workpiece to complete a cycle, and repeating said cycle at a preset regular frequency.

15. In automatic and semi-automatic arc welding apparatus, the combination for providing intermittent arc welding comprising: a source of consumable electrode; a welding current circuit including a constant-potential-type source for establishing a welding arc between said consumable electrode and a workpiece; a welding gun for directing the welding operation; and means for mechanically withdrawing said electrode from said source and feeding said consumable electrode to and through the welding gun toward said workpiece at a feed rate cyclically changing at a preset regular frequency so as repeatedly to cause the current density in said electrode to reciprocate at said preset frequency between a minimum value of current density within the range producing a heat density which melts electrode into liquid form and a peak value of current density within the range producing a heat density which converts electrode into spray form.

16. In automatic and semi-automatic arc welding in which consumable electrode is withdrawn from a source and fed to and through a welding gun toward a workpiece by an electrode feeding system while an electrical potential is impressed between said consumable electrode and said workpiece in a circuit including a constant-current-type welding current source so as to provide a welding arc, a method for intermittent arc welding comprising: by mechanical means associated with said electrode feeding system cyclically altering the voltage output of said constant-current-type welding current source at a pre-adjusted frequency by cyclically altering the rate of feed of said consumable electrode at said pre-adjusted frequency.

17. The method defined in claim 16 wherein in cyclically altering said feed rate said consumable electrode is fed in a relatively low feed rate range to provide relatively high voltage output of said constant-current-type source and then fed in a relatively high feed rate range to provide a relatively low voltage output of said constant-current-type source to complete a cycle at said pre-adjusted frequency.

18. The method defined in claim 16 wherein in cyclically altering said feed rate said consumable electrode is fed at a feed rate range which is substantially equal to or less than the melting rate of said electrode so as to form a suspended drop of electrode metal on the tip of said electrode at relatively high voltage output of said constant-current-type source and then said consumable electrode is fed at a feed rate range which is greater than said melting rate so as to lower said voltage output of said constant-current-type source and to bring said suspended drop of electrode metal into contact with liquid weld metal on said workpiece for detachment and transfer to said workpiece to complete a cycle at said pre-adjusted frequency, said welding arc in each cycle being short-circuited by said contact and re-established by said detachment.

19. In automatic and semi-automatic arc welding in which consumable electrode is withdrawn from a source and fed to and through a welding gun toward a workpiece by an electrode feeding system while an electrical potential is impressed between said consumable electrode and said workpiece in a circuit including a constant-potential-type welding curent source so as to provide a welding arc, a method for intermittent arc welding comprising: by mechanical means associated with said electrode feeding system cyclically altering the current output of said constant-potential-type welding current source at a pre-adjusted frequency by cyclically attering the rate of feed of said consumable electrode at said pre-adjusted frequency.

20. The method defined in claim 19 wherein in cyclically altering said feed rate said electrode is fed in a relatively low rate range to provide a relatively low current density at the tip of said electrode and thereby a relatively low heat density of said welding arc and then fed in a relatively high feed rate range to provide a relatively high current density at the tip of said electrode and thereby a relatively high heat density of said welding arc to complete a cycle at said pre-adjusted frequency.

21. The method defined in claim 20 wherein said low heat density is within a range causing a suspended drop of electrode metal to form on the tip of said electrode and said high heat density is within a range causing said suspended drop to be transferred through said arc to said workpiece in spray form.

References Cited

UNITED STATES PATENTS

| 2,886,696 | 5/1959 | Tuthill et al. | 219—137 |
| 3,053,975 | 9/1962 | Nelson et al. | 219—130 |
| 3,254,197 | 5/1966 | Anderson | 219—130 |

OTHER REFERENCES

German printed application 1,012,711, July 1957, 219—130.

RICHARD M. WOOD, *Primary Examiner.*

UNITED STATES PATENT OFFICE

CERTIFICATE OF CORRECTION

Patent No. 3,339,057                                         August 29, 1967

Arthur A. Bernard et al.

It is hereby certified that error appears in the above numbered patent requiring correction and that the said Letters Patent should read as corrected below.

Figures 10A, 10B:
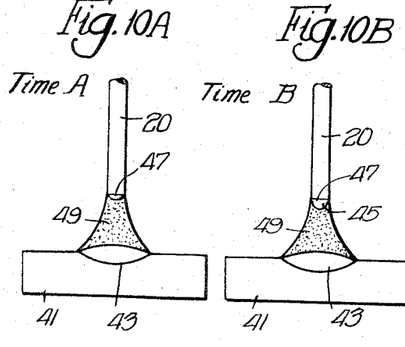
FIGURES 10A through 10D present an end view of the phenomenon of intermittent spray transfer according to the present invention.
Figure 10C:
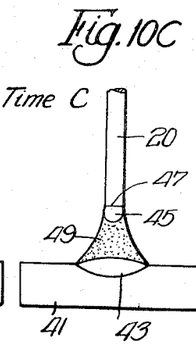
Figure 10D:
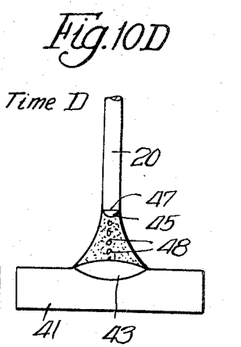

Column 1, line 40, for "lectrode" read -- electrode --; line 70, for "in" read -- is --; column 7, line 69, for "in" read -- is --; line 70, for "160" read -- about 160 --; column 8, lines 2 and 8, for "160", each occurrence, read -- 120 --; line 61, for "shrown" read -- shown --; column 11, line 8, for "illustrates" read -- illustrate --; line 35, for "FIGURE 10" read -- FIGURES 10A through 10D --; lines 36 and 37, for "FIGURE 9" read -- FIGURES 9A through 9D --; column 12, line 21, for "FIGURE 10" read -- FIGURE 10A --; line 34, for "electroe" read -- electrode --; column 14, line 42, for "semiautomatic" read -- semi-automatic --; line 58, for "present" read -- preset --; column 15, line 25, for "porduces" read -- produces --; column 16, line 27, for "curent" read -- current --; line 32, for "attering" read -- altering --.

Signed and sealed this 18th day of March 1969.

(SEAL)
Attest:

EDWARD M. FLETCHER, JR.                          EDWARD J. BRENNER
Attesting Officer                                   Commissioner of Patents